Dec. 15, 1953  V. LOMBARDI  2,662,383
KNITTING MECHANISM AND METHOD
Filed Dec. 9, 1947  21 Sheets-Sheet 1

INVENTOR.
VINCENT LOMBARDI
BY Robert Irving Williams
ATTORNEY

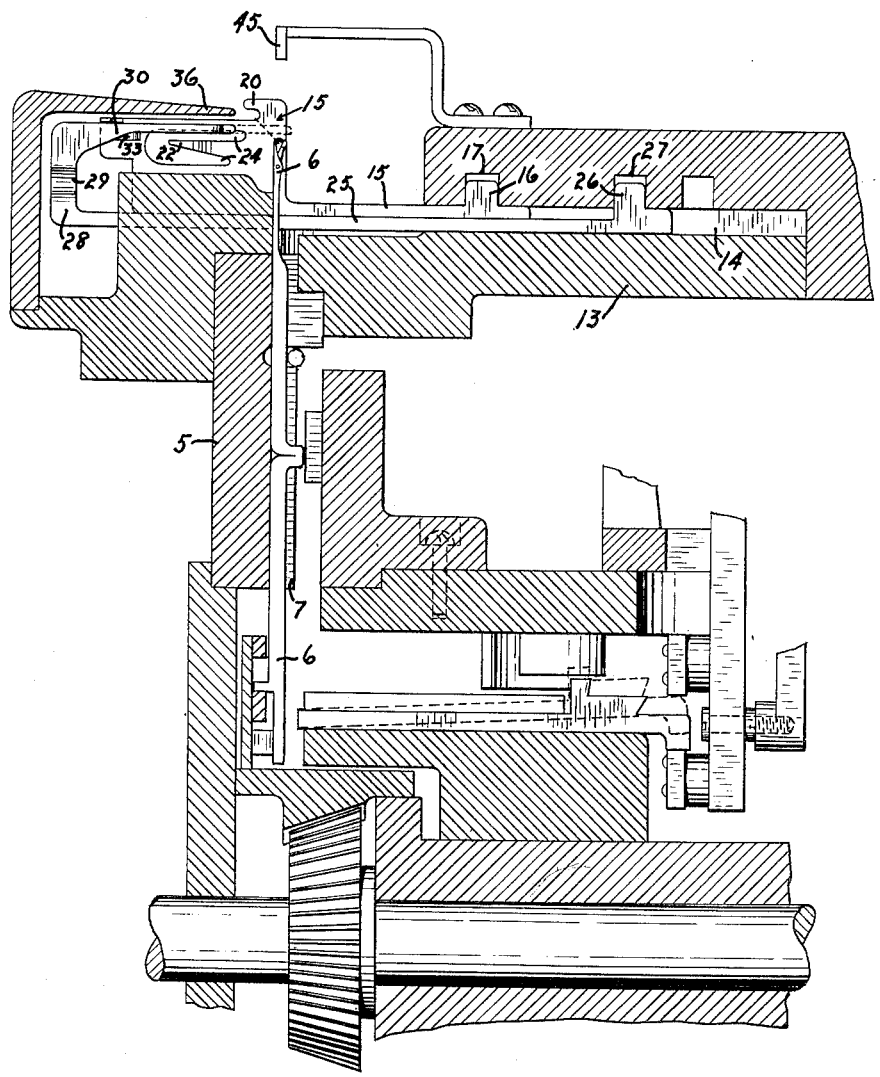

Dec. 15, 1953　　　　V. LOMBARDI　　　　2,662,383
KNITTING MECHANISM AND METHOD
Filed Dec. 9, 1947　　　　　　　　　　21 Sheets-Sheet 3
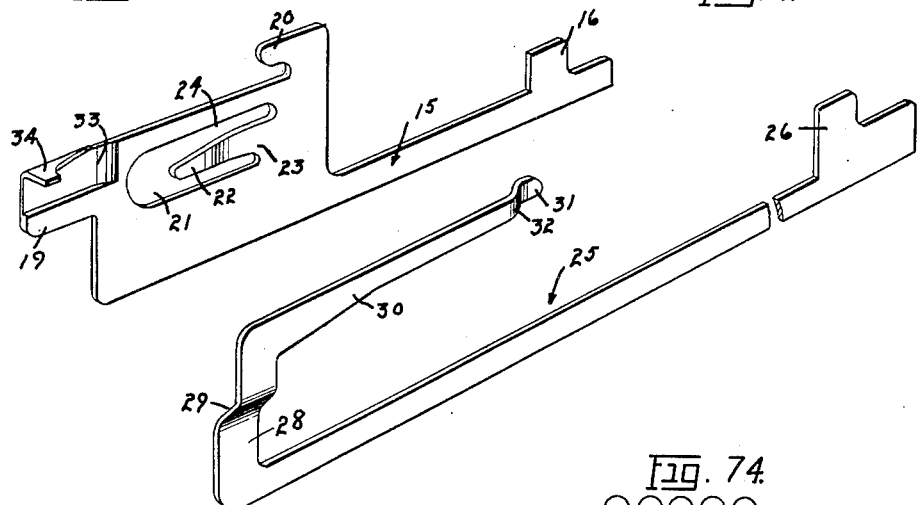
INVENTOR.
VINCENT LOMBARDI
BY
ATTORNEY Dec. 15, 1953     V. LOMBARDI     2,662,383
KNITTING MECHANISM AND METHOD
Filed Dec. 9, 1947     21 Sheets-Sheet 4
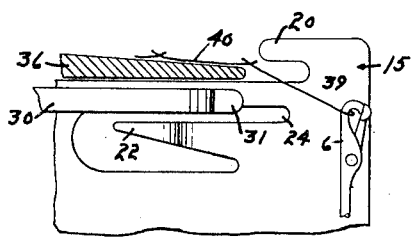
Fig. 7.
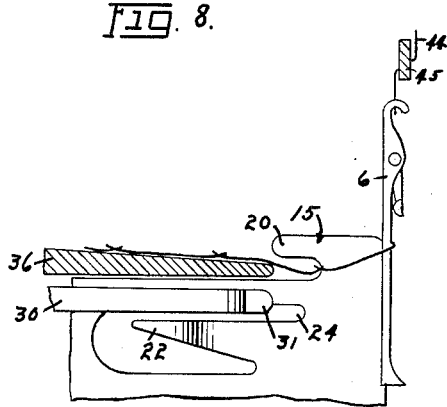
Fig. 8.
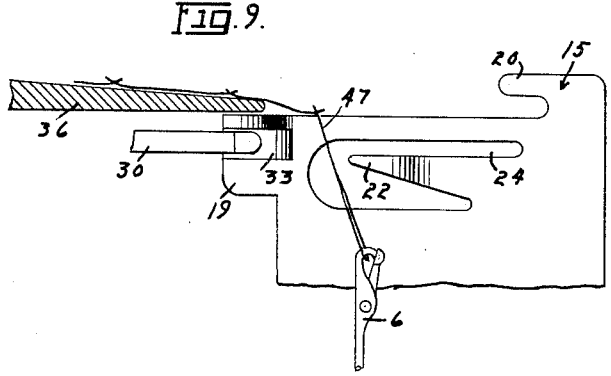
Fig. 9.
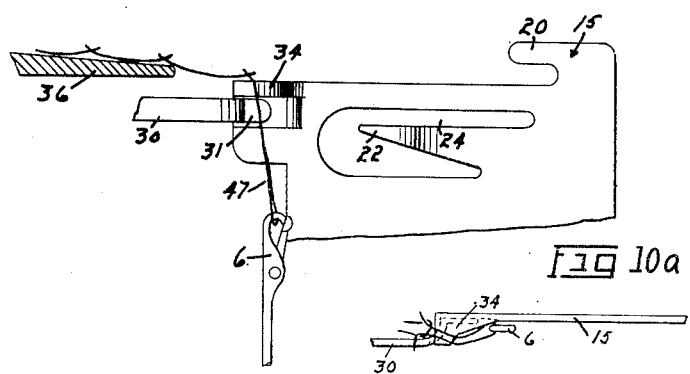
Fig. 10.
Fig 10a.
INVENTOR.
VINCENT LOMBARDI
BY Robert Irving Williams
ATTORNEY Dec. 15, 1953 V. LOMBARDI 2,662,383
KNITTING MECHANISM AND METHOD
Filed Dec. 9, 1947 21 Sheets-Sheet 5

INVENTOR.
VINCENT LOMBARDI
BY Robert Ivey Williams
ATTORNEY

Dec. 15, 1953   V. LOMBARDI   2,662,383
KNITTING MECHANISM AND METHOD
Filed Dec. 9, 1947   21 Sheets-Sheet 6

INVENTOR.
VINCENT LOMBARDI
BY Robert Irving Williams
ATTORNEY

INVENTOR.
VINCENT LOMBARDI
BY Robert Irving Williams
ATTORNEY

Dec. 15, 1953 V. LOMBARDI 2,662,383
KNITTING MECHANISM AND METHOD
Filed Dec. 9, 1947 21 Sheets-Sheet 8
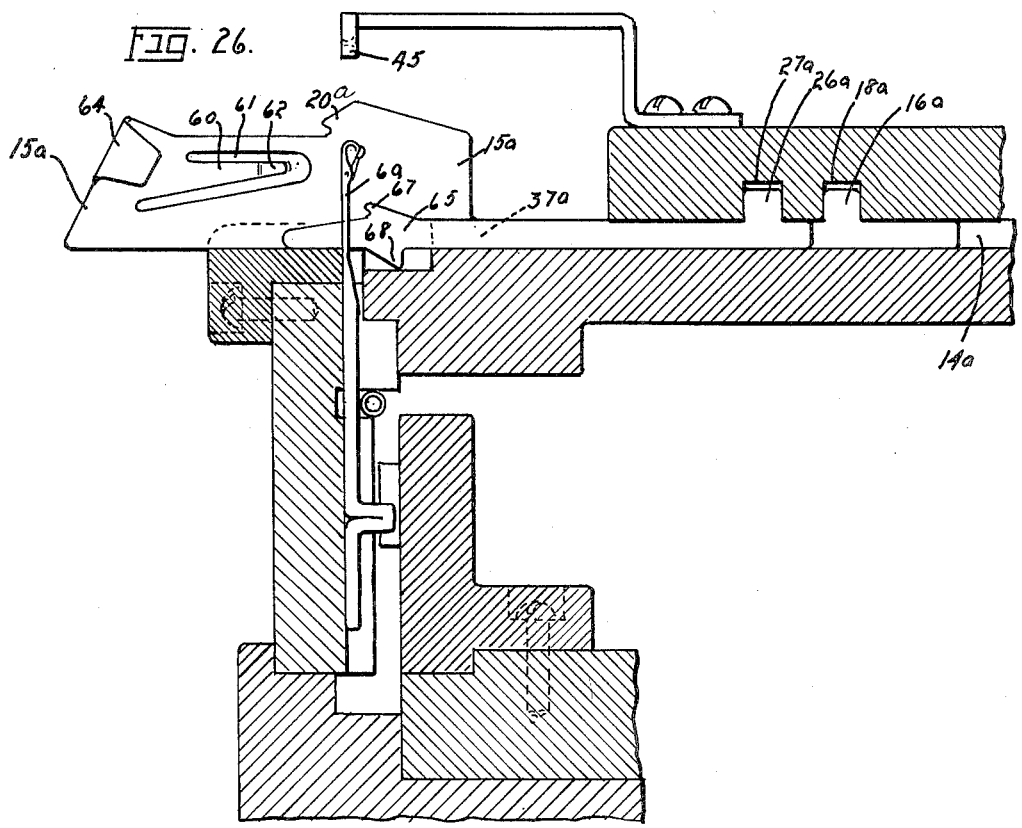
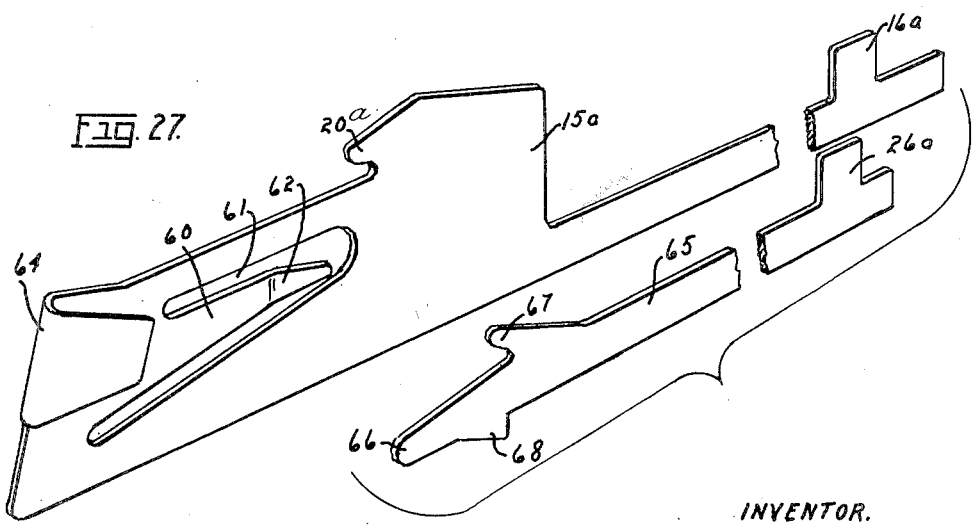
INVENTOR.
VINCENT LOMBARDI
BY: Robert Irving Williams
ATTORNEY.

Dec. 15, 1953 V. LOMBARDI 2,662,383
KNITTING MECHANISM AND METHOD
Filed Dec. 9, 1947 21 Sheets-Sheet 9
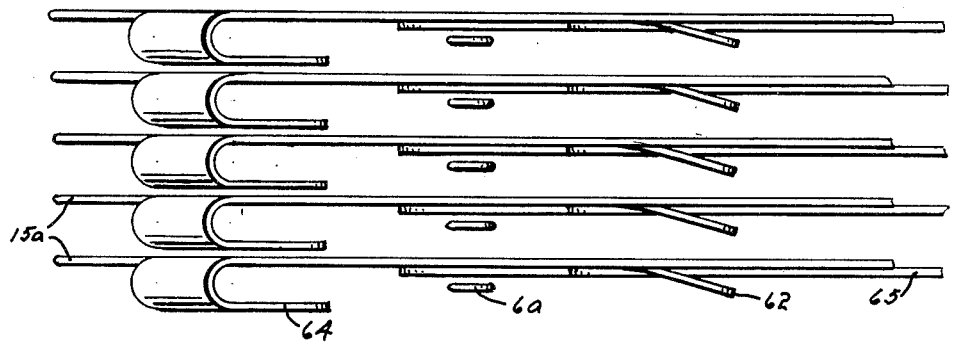
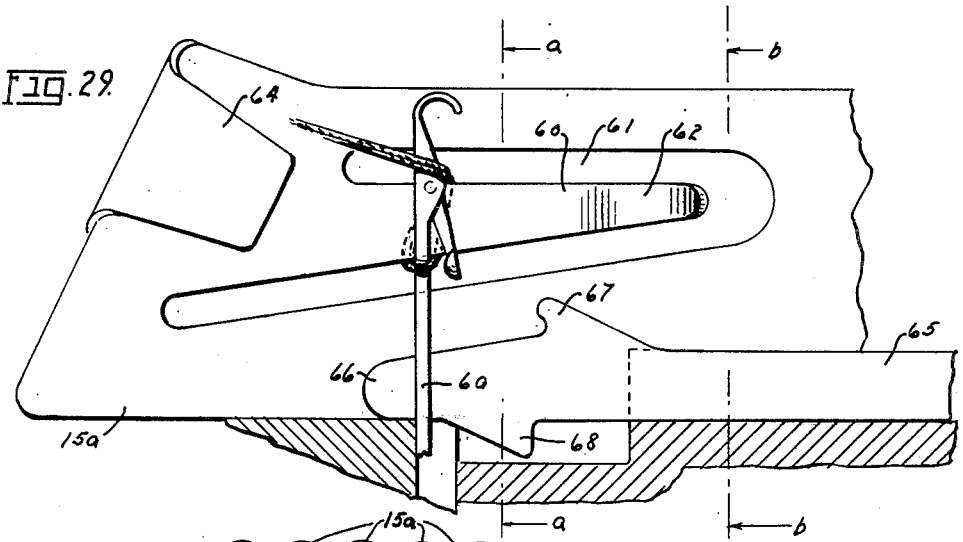
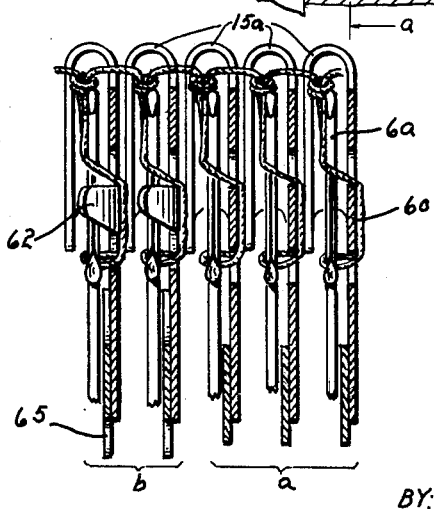
INVENTOR.
VINCENT LOMBARDI
BY: Robert Irving Williams
ATTORNEY.

INVENTOR.
VINCENT LOMBARDI
BY: Robert Irving Williams
ATTORNEY.

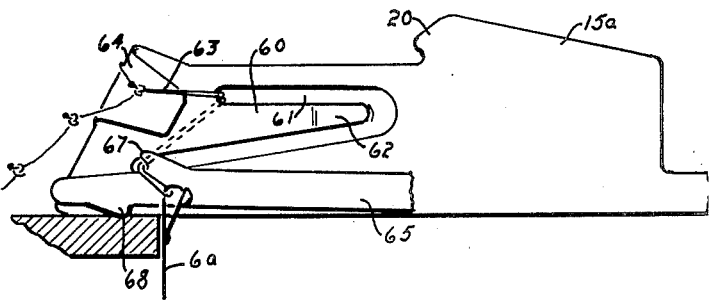
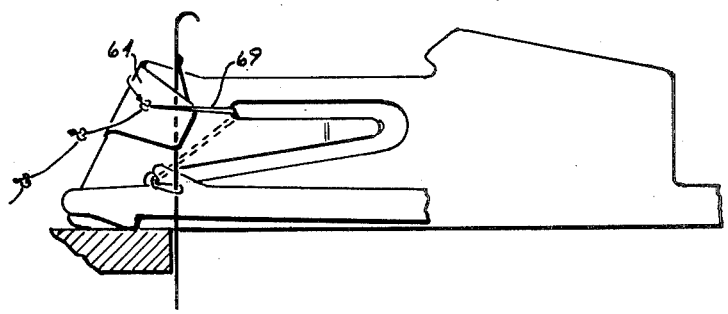
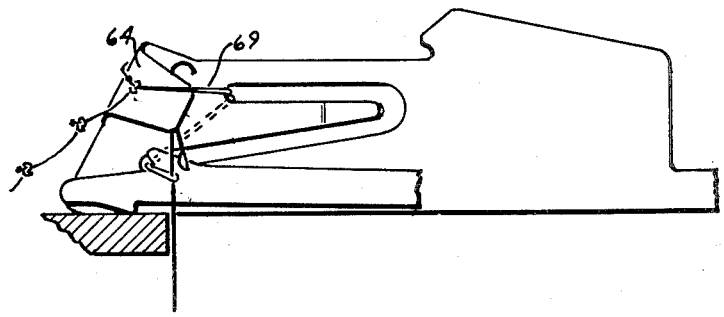
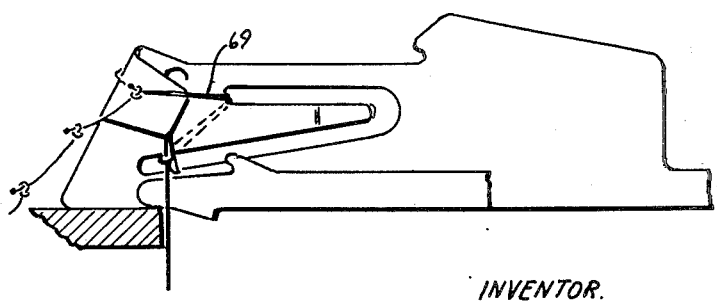

Dec. 15, 1953   V. LOMBARDI   2,662,383
KNITTING MECHANISM AND METHOD
Filed Dec. 9, 1947   21 Sheets-Sheet 12

INVENTOR.
VINCENT LOMBARDI
BY: Robert Ewing Williams
ATTORNEY.

Dec. 15, 1953  V. LOMBARDI  2,662,383
KNITTING MECHANISM AND METHOD
Filed Dec. 9, 1947  21 Sheets-Sheet 13

INVENTOR.
VINCENT LOMBARDI
BY
ATTORNEY.

Dec. 15, 1953          V. LOMBARDI          2,662,383
KNITTING MECHANISM AND METHOD
Filed Dec. 9, 1947                    21 Sheets-Sheet 15

INVENTOR
VINCENT LOMBARDI
BY: Robert Irving Williams
ATTORNEY

Dec. 15, 1953 V. LOMBARDI 2,662,383
KNITTING MECHANISM AND METHOD
Filed Dec. 9, 1947 21 Sheets-Sheet 16

INVENTOR
VINCENT LOMBARDI
BY: Robert Irving Williams
ATTORNEY

Dec. 15, 1953    V. LOMBARDI    2,662,383
KNITTING MECHANISM AND METHOD

Filed Dec. 9, 1947    21 Sheets-Sheet 17

INVENTOR
VINCENT LOMBARDI
BY: Robert Irving Williams
ATTORNEY

INVENTOR
VINCENT LOMBARDI
BY: Robert Irving Williams
ATTORNEY

Dec. 15, 1953  V. LOMBARDI  2,662,383
KNITTING MECHANISM AND METHOD
Filed Dec. 9, 1947  21 Sheets-Sheet 20
Fig. 67.
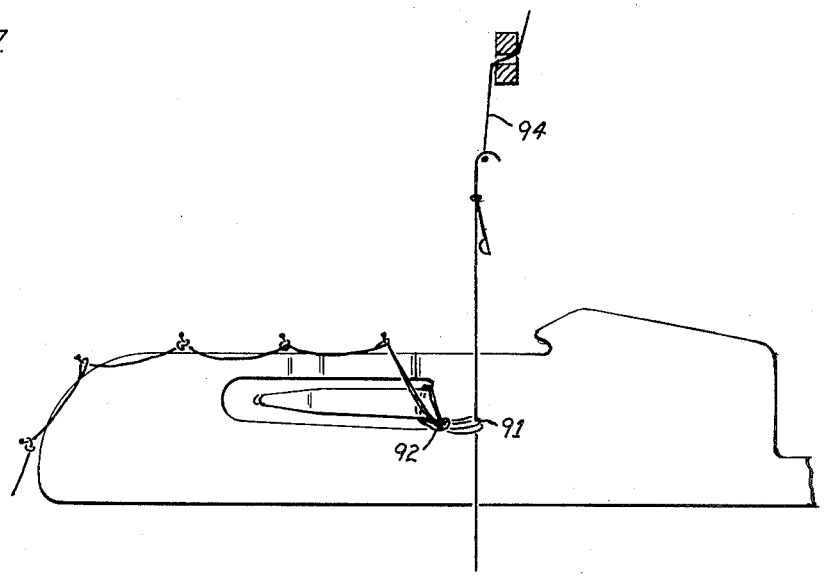
Fig. 68a.  Fig. 68.
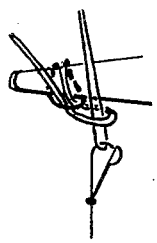 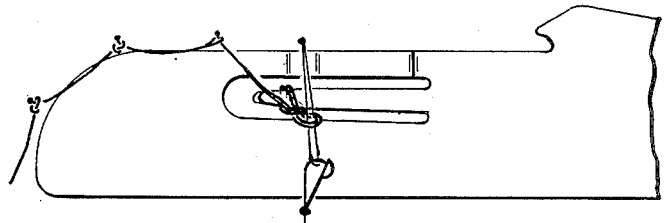
Fig. 69.
Fig. 69a.
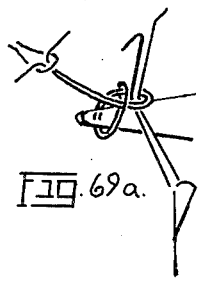 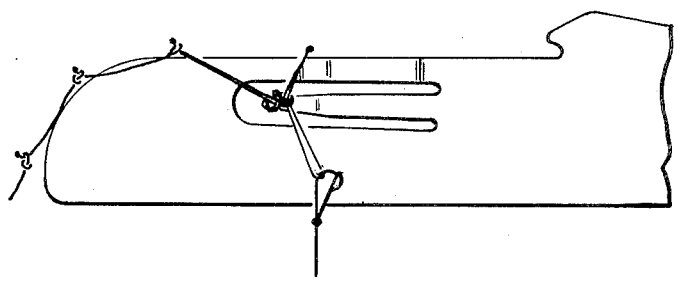
INVENTOR
VINCENT LOMBARDI
BY: Robert Irving Williams
ATTORNEY Dec. 15, 1953 V. LOMBARDI 2,662,383
KNITTING MECHANISM AND METHOD
Filed Dec. 9, 1947 21 Sheets-Sheet 21
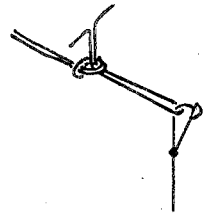
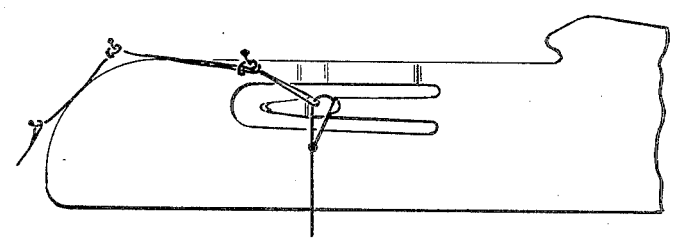
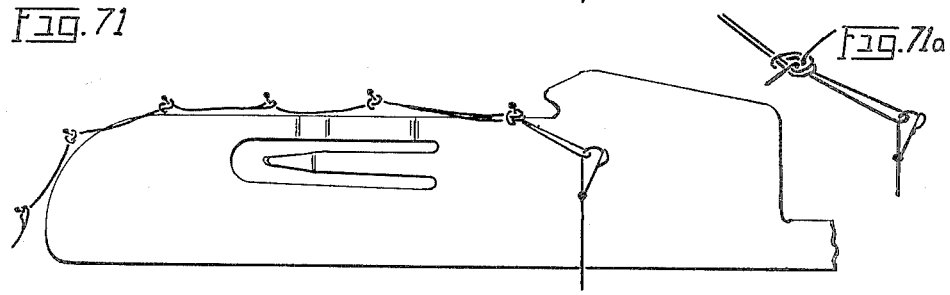
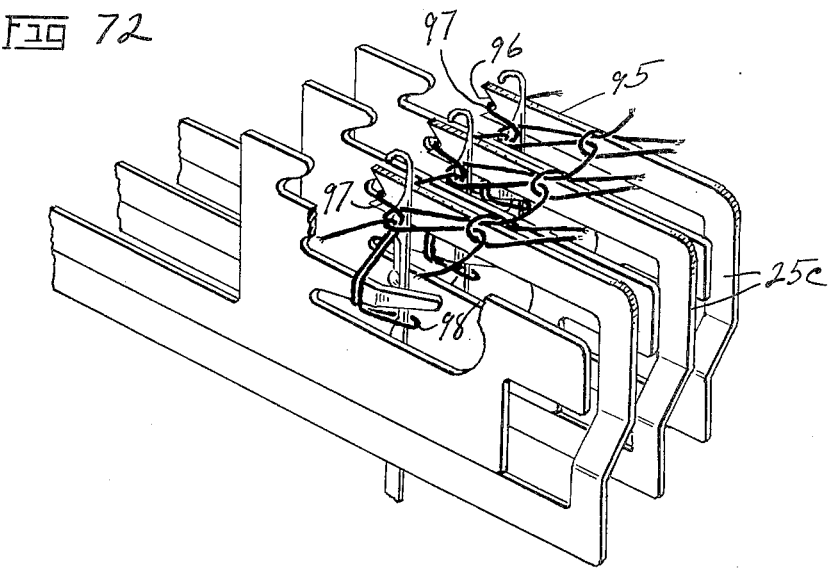
INVENTOR
VINCENT LOMBARDI
BY: Robert Irving Williams
ATTORNEY Patented Dec. 15, 1953

2,662,383

UNITED STATES PATENT OFFICE 2,662,383

KNITTING MECHANISM AND METHOD

Vincent Lombardi, Miami, Fla., assignor to Lombardi Knitting Machine Co., Inc., Miami, Fla., a corporation of New York Application December 9, 1947, Serial No. 790,591

30 Claims. (Cl. 66—50)

This invention relates to knitting machines and to correlated inventions and discoveries appertaining thereto.

This application is in part a continuation of my copending application Serial No. 562,622, filed November 9, 1944, now Patent No. 2,434,045.

An object of the invention is the provision of means whereby knotted fabrics such, for example, as those described and claimed in my said copending application may be accurately and efficiently produced. The commercial manufacture of knotted fabrics on knitting machines has been greatly retarded by the slowness of operation as well as the cumbersome and expensive nature of machines for producing them. The present invention on the other hand contemplates the provision of means which may be embodied in and attached to fast-operating circular knitting machines as well as various other types of machines which machines will operate efficiently, accurately, and effectively to produce a variety of types of fabric embodying special stitches including knots and other highly complicated stitches.

Pursuant to the invention there is provided yarn-manipulating means controlled from the sinker bed and which may be embodied in sinkers themselves or in independent elements or both and which serve to cooperate with the needle movements to bring particular portions of the yarn into various desired positions with respect to the path of one or more needles at desired stages in the operation. Advantageous yarn-manipulating steps are also provided. Pursuant to the invention also, novel and highly desirable types of knots and of fabrics are produced.

The invention accordingly comprises a machine embodying the features of construction, combinations of elements and arrangement of parts, the several steps and relation of order of one or more of such steps with respect to each of the others, and the articles possessing the features, properties, and relation of elements, all of which will be exemplified in the following detailed disclosure and the scope of the application of which will be indicated in the claims.

For a fuller understanding of the nature and objects of the invention, reference should be had to the following detailed description taken in connection with the accompanying drawings, in which:

Fig. 2 is a sectional view along the lines 2—2 of Fig. 1 showing the operating mechanism;

Fig. 3 is an enlarged perspective view of one of the sinkers of Fig. 1;

Fig. 4 is a similar view of one of the manipulator elements;

Fig. 5 is an enlarged, somewhat schematic view of a knot such as disclosed in my said copending application Serial No. 562,622 filed November 9, 1944, which, among others, the form of construction shown is adapted to produce;

Fig. 6 is a diagrammatic view from said copending application, showing a form of fabric embodying such a knot;

Figs. 7–21 are diagrammatic views showing successive stages in the operation of forming the knot of Fig. 4 in a fabric (such for example as those illustrated) by the machine of Figs. 1–3, Fig. 10a being an end view of the members shown in Fig. 10, and Figs. 19a, 20a and 21a being enlarged views showing the yarn conformation at the stages of Figs. 19, 20 and 21, respectively;

Fig. 26 is a view similar to Fig. 2 showing a modified form of mechanism embodying the invention;

Fig. 27 is a perspective grouped view showing the sinker and manipulator of Fig. 26;

Fig. 28 is a top view of the needles, sinkers, and manipulators of Figs. 26 and 27 in the positions in which they are arranged on the needle bed;

Fig. 29 is a side view of the elements of Fig. 28, showing a loop held by the needle and the sinker tongue;

Fig. 30 is a cross-sectional view showing the elements of Fig. 28;

Figs. 31–45 are diagrammatic views showing successive stages in the operation of forming the knot of Fig. 5 in the fabrics of Fig. 6 by the machine of Figs. 26–30, Fig. 35a being a view similar to 19a showing the yarn conformation at the stage of Fig. 35;

Figure 47:
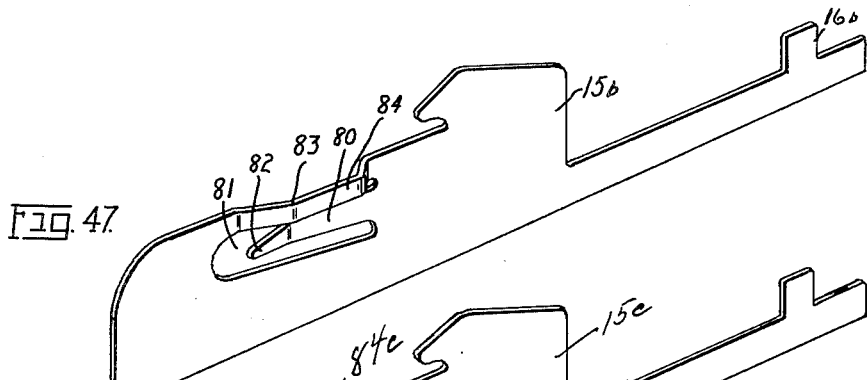
Fig. 47 is a view similar to Fig. 3 showing the sinker of Fig. 46.
Figure 48:
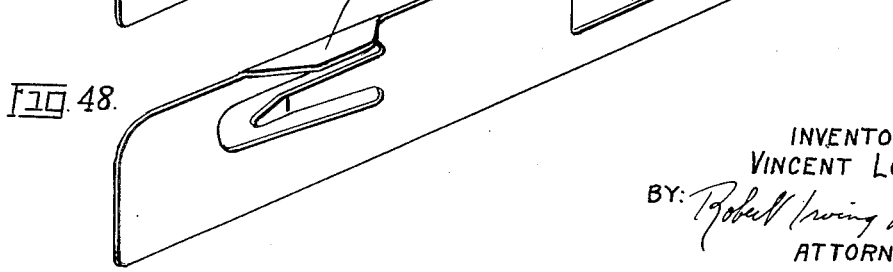
Fig. 48 is a view of a slightly modified form of sinker adapted for use in place of the sinker of Fig. 47.
Figure 49:
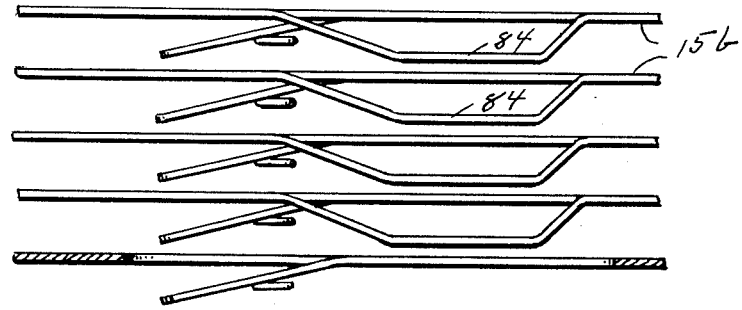
Fig. 49 is a view similar to Fig. 28 showing the needles and sinkers of Fig. 46.
Figure 50:
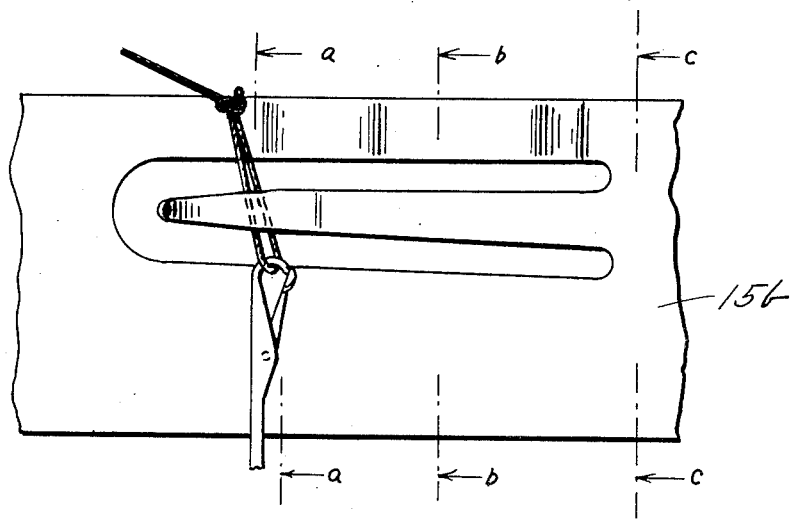
Fig. 50 is a view similar to Fig. 29 showing the needle and sinker of Fig. 46.
Figure 51:
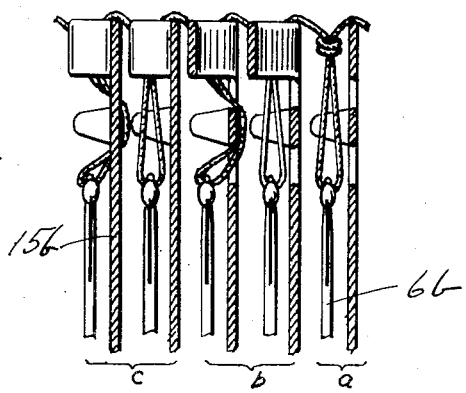
Fig. 51 is a view similar to Fig. 30 showing the needles and sinkers of Fig. 46.

Figs. 52–71 are diagrammatic views showing successive stages in the operation of forming the knot of Fig. 5 in the fabrics of Fig. 6 by the machine of Figs. 46, 47, 49, 50 and 51 (it being understood that the sinker of Fig. 48 may be substituted for the sinker of Fig. 47, if desired); Figs. 68a, 69a, and 70a being a view similar to Fig. 19a of the conformation of the yarn at the stage of Figs. 68, 69, and 70, respectively;

Fig. 72 is a fragmentary perspective view showing an alternative form of manipulator in use;

Fig. 73 is a partial diagrammatic view and Fig. 74 is a schematic view of an improved type of fabric contemplated by the invention; and Fig. 75 is a schematic view of a modified form of fabric.

Figure 1:
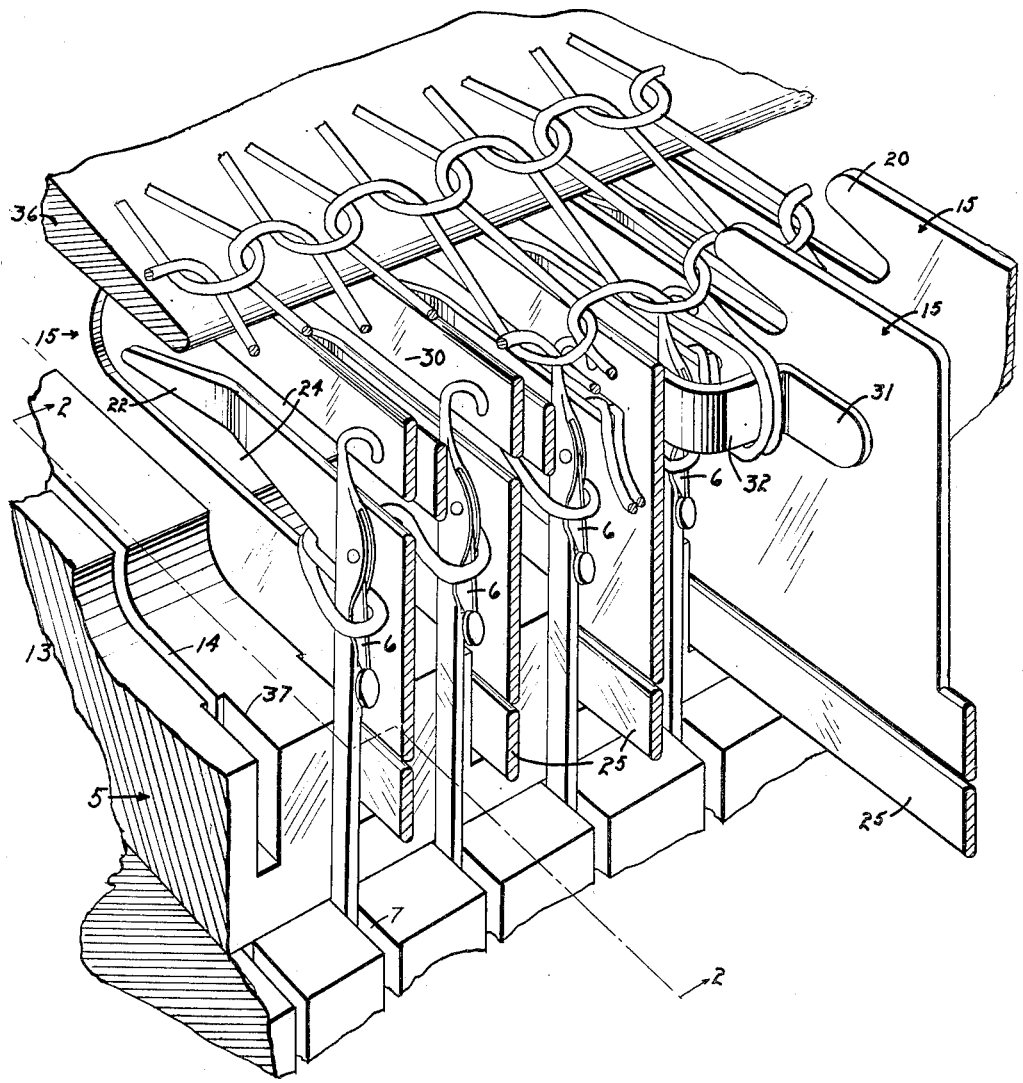
Figure 1 is a perspective view of a portion of the needle and sinker beds of a standard circular knitting machine modified to embody the invention.

In Figs. 1, 2, and 3 there is exemplified one form of circular knitting machine embodying the invention. This comprises a needle cylinder 5 carrying a series of latch needles 6 in the slots 7 thereof. Any well known or suitable operating means may be employed but there is preferably employed selective needle-operating means. As exemplified these comprise a pattern drum operated by well known control mechanism in accordance with the perforations in a continuous perforated pattern sheet. For example there may be used means such as shown in my Patent Nos. 1,650,083 and 1,866,945, issued November 22, 1927 and July 12, 1932, respectively. The machine also comprises a sinker bed 13 having slots 14 in which sinkers 15 are disposed. The sinkers are formed with butts 16 guided in a sinker cam groove 17. In the present instance the sinker movement is non-selective but any well known or suitable selective means may be employed. Each sinker is formed with a forward nib 19 and a standard upper nib 20. In accordance with the invention there is cut out from each sinker at 21 a tongue 22 adapted to hold yarns on a needle and to prevent the held yarns from moving down when the needle is retracted. The tongue is secured at its rear end to the sinker, being integral therewith at 23 in the present instance, and is bent laterally so that its forward end projects beyond the plane of the sinker. The tongue 22 is tapered toward its inward end to permit a yarn to slip off more readily when the sinker is moved outwardly. Desirably and as exemplified the cut-out portion 21 is made slightly larger than the tongue 22 so as to provide a wide slot 24 in which a standard yarn can easily fit without binding. The upper portion of the slot 24 is disposed outwardly of the lower end of the slot a suitable distance so that the needle can be outward of the lower end and at the same time inward of the upper end (see, for example, Fig. 12). Thus the line of jointure of the tongue with the sinker runs diagonally downwardly and inwardly.

The slots 14 as exemplified are made large enough to accommodate not only the sinkers 15 but also suppplemental manipulators 25. These manipulators have at their outer or rear ends butts 26 extending into a cam groove 27 in the sinker bed which is similar in character but different in contour from the sinker cam groove 17. At their inner or forward ends the manipulators are formed with upward arms 28 which are bent laterally at 29 so that their upper portions lie to one side of the sinkers. Each upward arm carries a rearwardly (outwardly) extending arm 30 a portion of which near the outer end 31 is bent toward the sinker to provide an abutment 32 for engaging a yarn and pushing it outwardly as the arm 30 moves outwardly, and to provide a needle-receiving space between the arm 30 and the sinker. The end 31 is resiliently pressed toward the sinker to work under a yarn hanging therefrom. To facilitate this action each sinker is formed with a slight depression 33 in which the end 31 moves. The abutment 32 is slanted so that the yarn will slip off of it as the yarn comes under tension. The upper edges of the inner portions of the sinkers are bent over as at 34 above the arms 30 to provide guards to push the loop laterally. A fabric ring carries an annular table 36 extending above the inner ends of the sinkers and manipulators.

Pursuant to the invention in certain of its more specific aspects, the relative width of the sinkers and their slots is varied toward the inner ends of the slots to provide play between the sides of the sinkers and the walls of their slots. As exemplified, the outer ends of the slots are widened at 37, as by providing a slightly spread conformation. A widened slot permits the sinker and/or manipulator or other element in the slot to yield slightly if it encounters an obstruction as it moves between the needles. Thus, undue strain on the sinkers and other elements is avoided, and, even if the needles are closely spaced with respect to the lateral distance occupied by elements in the needle slot and are pushed to one side as an element in the sinker slot moves past the line of needles, the needles do not need to do all the yielding, but the sinkers or other elements are themselves permitted to yield enough so as not to subject the needles to undue strain.

Figure 11:
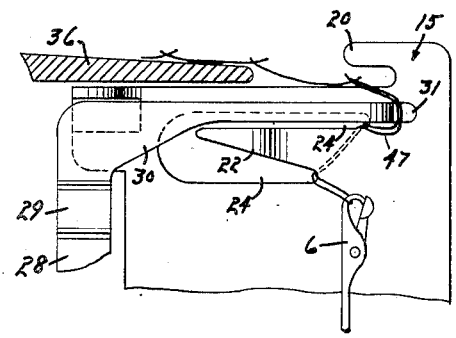
Figure 12:
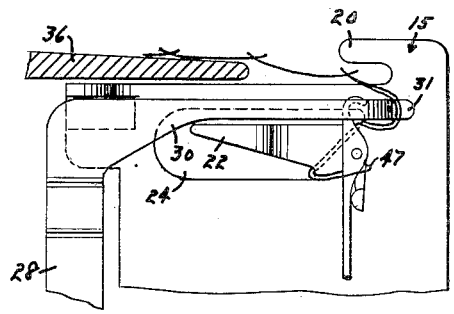
Figure 13:
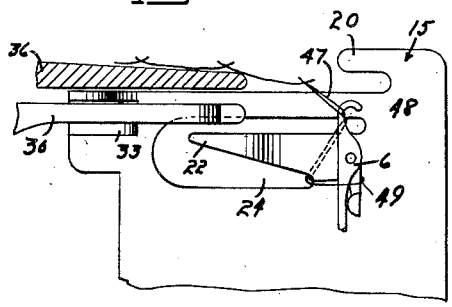

This form of construction can be operated simply, efficiently, and effectively in the manner illustrated for example in Figs. 7–21 to produce fabric such as shown in Figs. 4 and 5, as shown in my said application Serial No. 562,622. Fig. 7 shows the present machine with a loop 39 on the illustrated needle 6, this loop forming a part of the fabric 40 which has been knitted and is resting under the nib 20 of a particular sinker 15. The first movement of the parts is the raising of the needle 6 to the position of Fig. 8 to receive a yarn 44 from a suitable one of one or more yarn feeds 45. Fig. 9 shows the needle retracted having formed a loop 47 of the new yarn. As shown in Figs. 10 and 10a the sinker 15 has been moved outwardly so as to bring the tongue 22 outside of the loop 47, and to bring the end 31 of the arm 30 behind the loop 47. In Fig. 11 the sinker has been moved inwardly so as to catch the loop 47 in the slot 24 behind the tongue 22, and the arm 30 moved outwardly so that its abutment 32 has engaged the loop 47 to bring it outward of the line of needles and sink it firmly in the slot 24. With the loop held in this position, the needle 6 is raised to tucking position as shown in Fig. 12. As the needle is advanced it passes in front of the sinker but behind the arm 30. The loop can now be wrapped around the needle with no other manipulation than the inward movement of the arm 30, and may occur without this, as the loop 47 can slide along the front of the arm. In Fig. 13 this inward movement of the arm 30 is shown as accomplished. The loop now comes from the fabric and passes in front of the needle at 48 and then behind the needle and behind the tongue 22, and then, as it comes out of the slot 24 it is looped over the needle and its latch at 49. The needle is thereupon raised sufficiently to slide the portion 49 off the latch as shown in Fig. 14.

Figure 14:
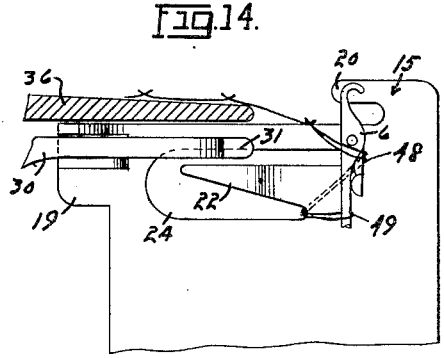
Figure 15:
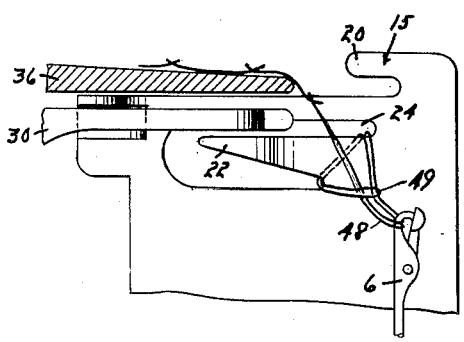
Figure 16:
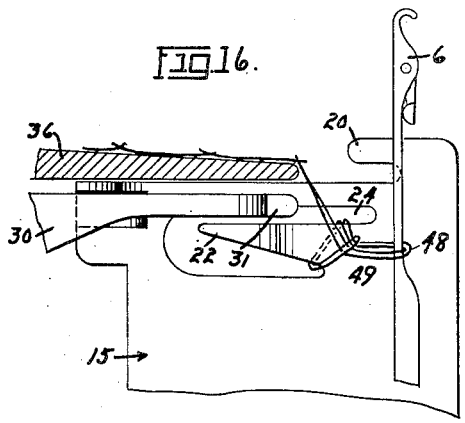
Figure 17:
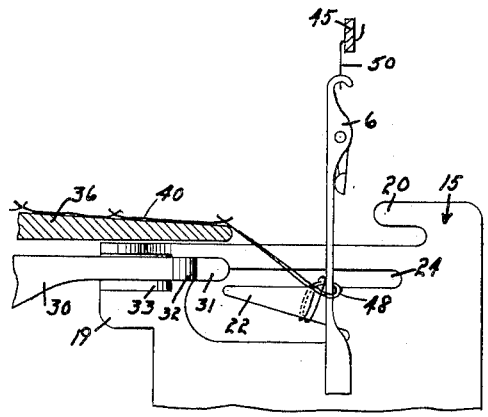
Figure 18:
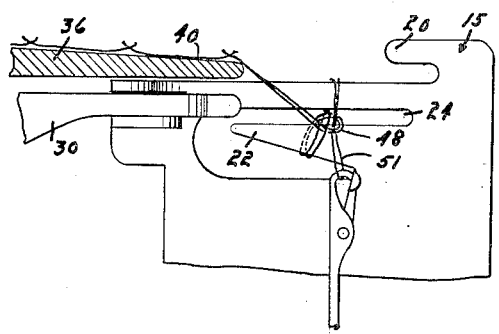
Figure 19:
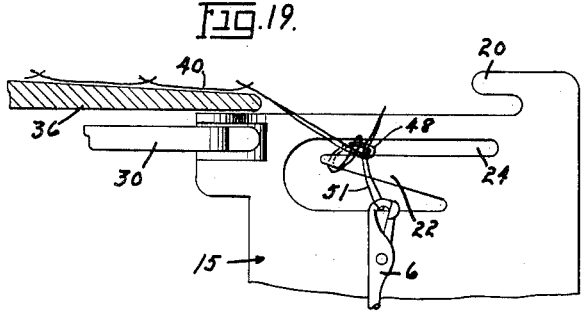
Figure 19A:
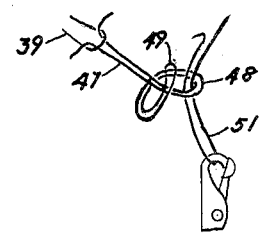
Figure 20:
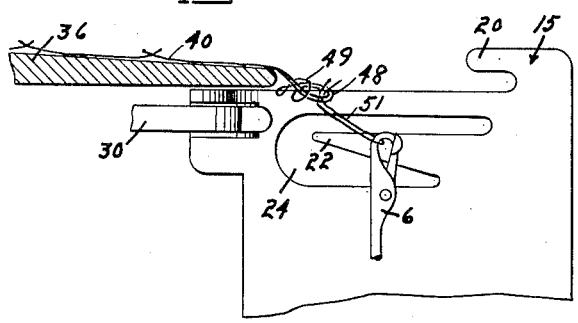
Figure 20A:
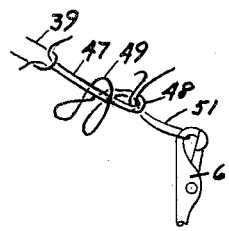
Figure 21:
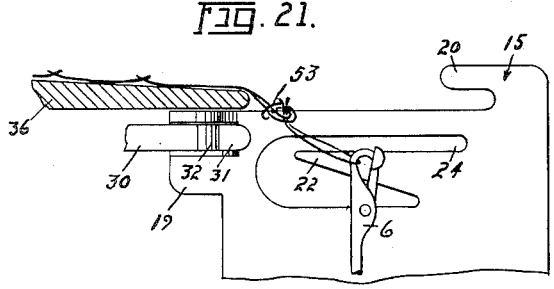
Figure 21A:
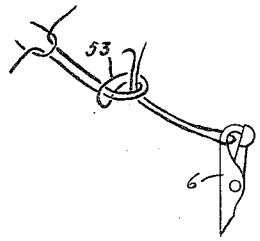

When, however, the needle is retracted from the tucking position of Fig. 14 it draws down the portion 48 and casts off the portion 49 so that the portion 48 extends through the portion 49 while the body of the loop is still held on the tongue 22 as shown in Fig. 15. The portion 49 is now an eyelet thru which the loop 48 extends. The inward movement of the sinker draws this eyeleted arrangement tighter leaving the portion 48 drawn out as shown in Fig. 16, whereupon the sinker may be moved outwardly again (Fig. 17) permitting an advance of the needle which brings the portion 48 below the latch. The introduction of a new yarn 50 from a yarn feed 45 prepares the eyeleted knot, which is still held on the tongue 22 of the sinker, for the reception of a new loop 51 (Fig. 18) thru the portion 48 which has been looped over the shank of the needle. The sinker 15 now moves outwardly (Fig. 19) to withdraw the tongue 22 from the knot which has been formed thereon, thus leaving the knot with the new loop 51 extending thru its portion 48 (Figs. 19 and 19a). As shown in Figs. 20 and 20a this knot now lies between the fabric 40 and the loop 51 which is on the needle. The weight of the fabric 40 tends to reorient the loops to form a true knot as shown at 53 (Figs. 21 and 21a) which corresponds with the knot of Fig. 5.

The new loop 51 may be knotted as was the loop 47 or it may be knitted in the jersey fashion with successive loops as may be desired, the series of knotting operations as shown being repeated at whatever stages may best suit the requirements of a particular case.

Figure 22:
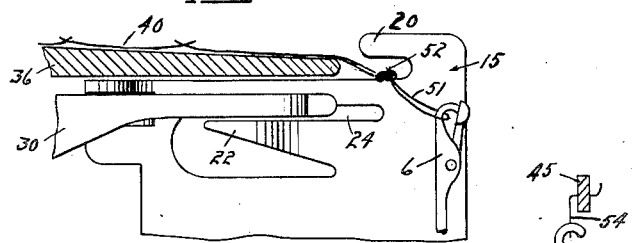
Figs. 22–25 are views similar to Figs. 7–21, showing further stages in cases where a knot is to be followed by a jersey loop, Fig. 22a being a view similar to Fig. 19a showing the yarn conformation at the stage of Fig. 22.
Figure 22A:
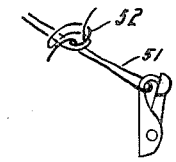
Figure 23:
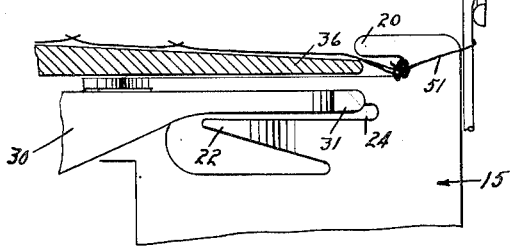
Figure 24:
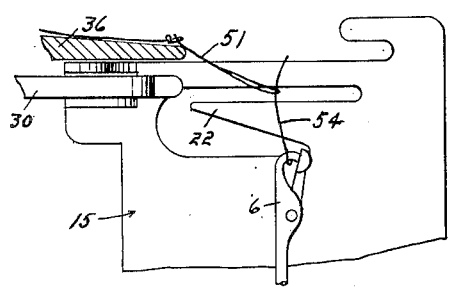
Figure 25:
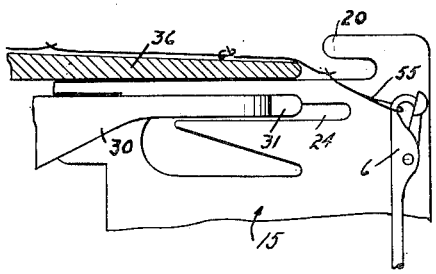

In Figs. 22-25 the needle is shown knitting the loop 51 into the fabric as an additional jersey stitch. The sinker is moved inwardly (Fig. 22) to receive the knot 52 (Figs. 22 and 22a) under its nib and the needle is advanced (Fig. 23) to receive a yarn 54 from a yarn-guide 45, and to cast the loop 51 off its latch. The needle is retrated and the sinker moved outwardly but not enough to bring the tongue 22 outwardly of the yarn 54. There is thus formed a new loop 55 (Fig. 25) which may in turn either be utilized to form a knot or knitted in as a jersey loop.

Figure 31:
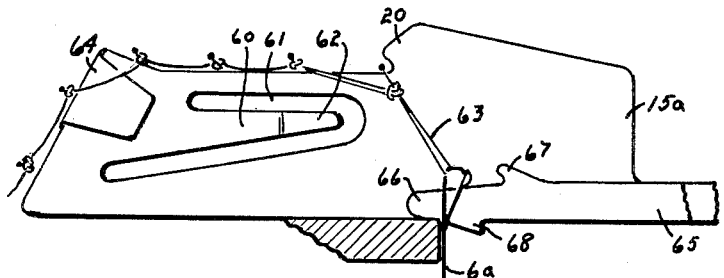
Figure 32:
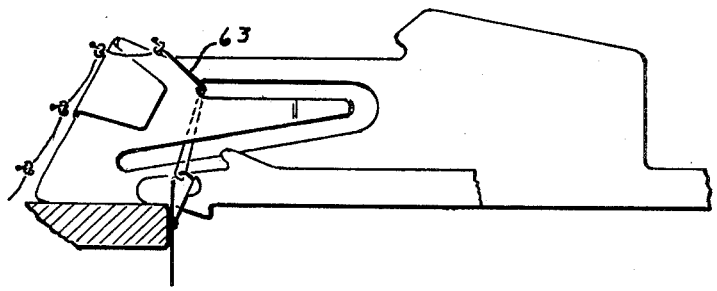
Figure 33:
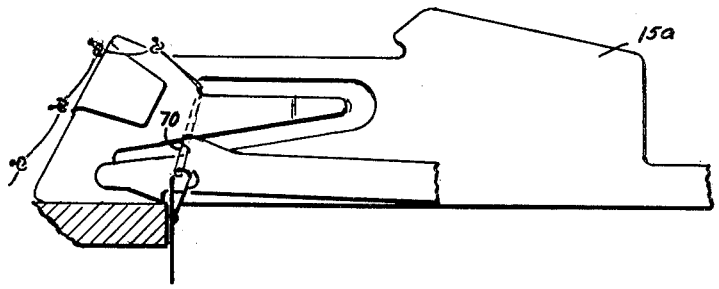
Figure 34:
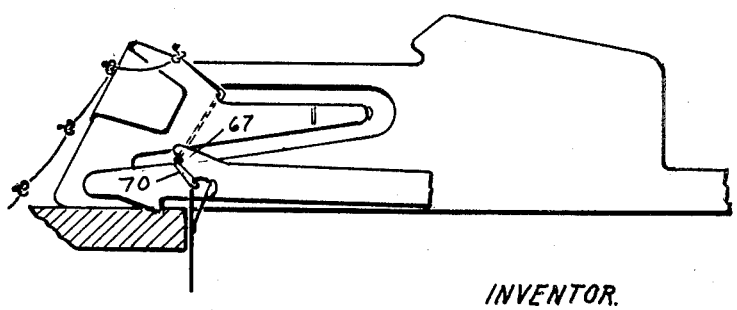
Figure 39:
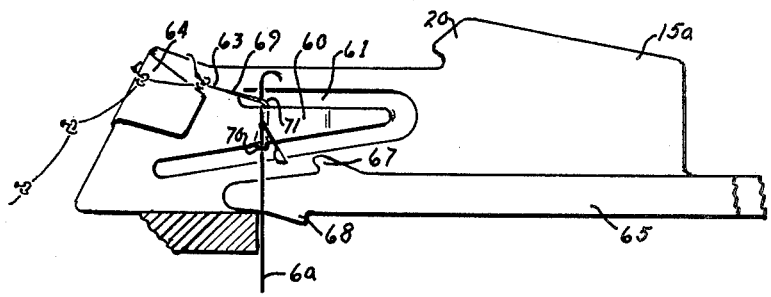
Figure 40:
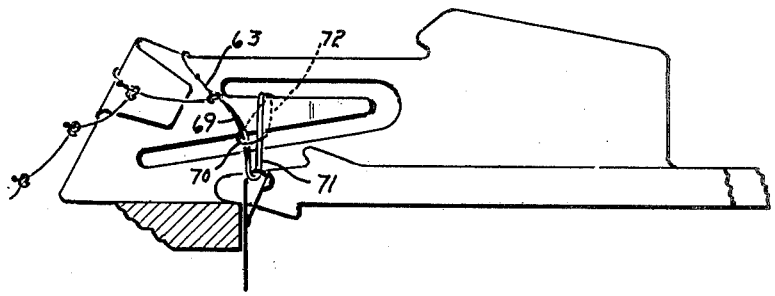
Figure 41:
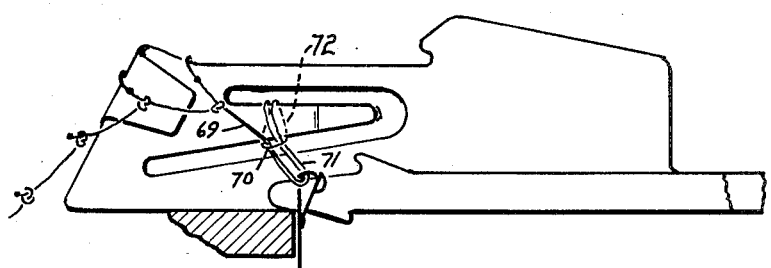
Figure 42:
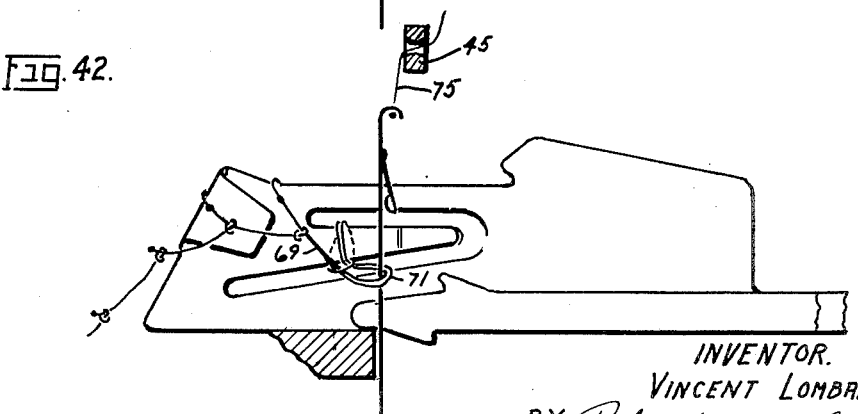
Figure 43:
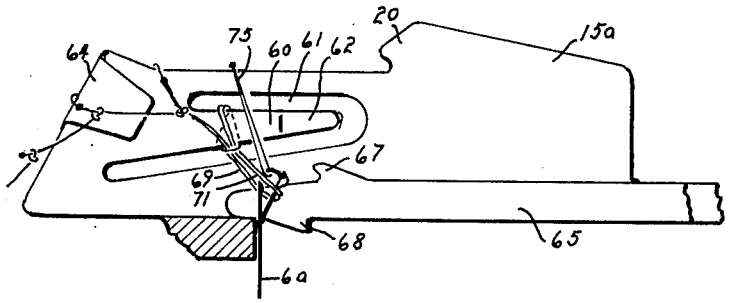
Figure 44:
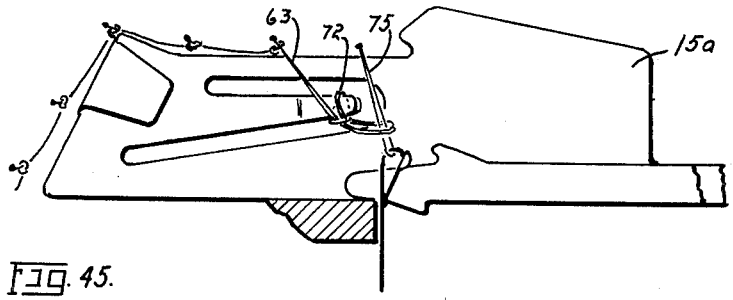
Figure 45:
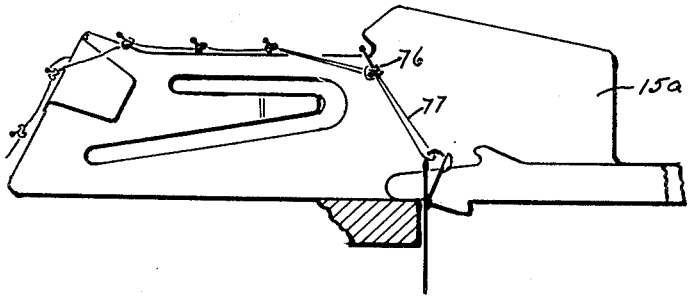
Figure 46:
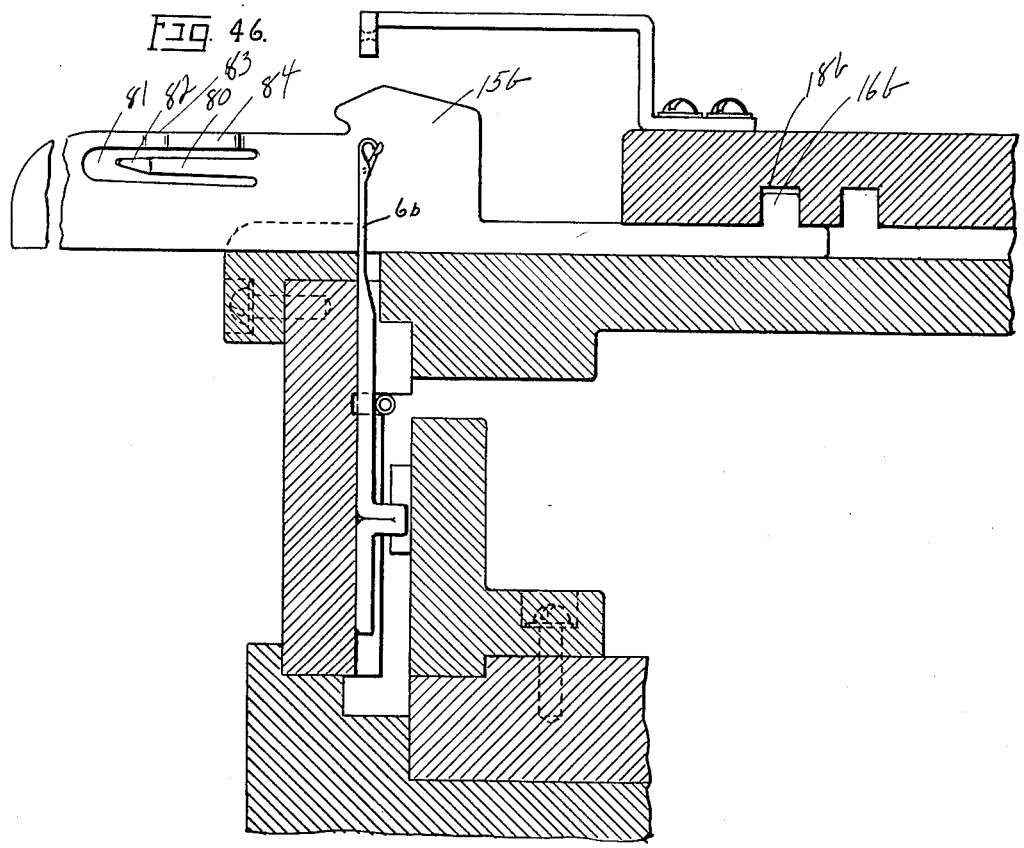
Fig. 46 is a view similar to Figs. 2 and 26 showing another modification.

In the form of construction of Figs. 26-45 knot-forming mechanism of a modified character is provided. Needles 6a similar to the needles 6 are provided and are operated by similar or other standard or suitable selective or other means. The sinkers 15a are provided in slots 14a which are widened inwardly as at 37a, and are formed with nibs 20a similar to the nibs 20 and with butts 16a movable in a cam track 18a. The sinkers 15a instead of being provided with inwardly-pointing tongues such as 22 are provided with similarly-formed but outwardly-pointing tongues 60 set in a V-shaped slot 61 and having a forwardly-bent end 62 adapted to project across the path of the needles so as to intercept a loop 63 held by a retracted needle. The sinker is also formed at the upper part of its inner end with a hook-portion 64. In the same slot with the sinker but disposed laterally thereof and having an independent movement is a manipulator member 65 having an inwardly projecting end 66, an upper nib portion 67 adapted for moving yarn inwardly, and a lower nib portion 68 adapted for moving the arm upwardly. The manipulator 65 has a butt 26a adapted to move in a cam track 27a. In the exemplified mode of operation the sinker will be inward and the manipulator outward at the time the needle 6a is retracted after the formation of a loop 63 as shown in Fig. 31. The retraction of the sinker to the position of Fig. 32 results in the catching of the loop 63 behind the tongue 60. The retraction of the sinker also brings the hook portion 64 in contact with the loop as shown in Fig. 35a. The inward movement of the manipulator 65 engages the butt with a portion 70 of the looped yarn 63 as shown in Figs. 33-35 and draws the portion 70 inwardly to the lower inner end of the slot 61 and inwardly of the needle as shown in Fig. 34. Fig. 35 shows the sinker in an outward position so as to clear the upper portion of the loop of the advancing needle. The needle is then advanced as shown in Fig. 36 so as to slip the portion 70 off its latch, and retracted slightly as shown in Fig. 37. The needle as it goes upward moves behind the hook portion 64 and behind a portion 69 of the loop 63, so that the loop 63 is now in effect twisted about the needle. The manipulator 65 is now retracted as shown in Fig. 38 and the sinker is advanced to permit the inward movement of the portion 69 of the loop so that a part 71 thereof will rest against the needle underneath the hook of the needle and above the open latch thereof as shown in Fig. 39. The retraction of the needle as shown in Fig. 40 results in the catching of the portion 71 of the loop by the hook of the needle and the casting of the portion 70 off the needle and over the part 69—71 of the loop, while the part 72 of the loop still encircles the tongue 60 as shown in Fig. 41. The sinker is shown in an advanced position so as to tighten the new double loop back from the needle and the needle is shown in Fig. 42 as advanced to receive a new yarn 75 as from a yarn feed 45 and to slip the portion 69—71 off the latch of the needle. The retraction of the needle as in Fig. 43 then draws the new yarn 75 thru the portion 69—71 of the previous loop which portion is cast off the needle, as shown in Fig. 44, whereupon the inward movement of the sinker 15a (Fig. 44) casts the portion 72 of the loop 63 off tongue 60 leaving an eyeleted knot 76 (Fig. 45) such as shown in Fig. 5. From this knot a loop 77 extends to the hook of the needle ready for the formation of additional knots or the formation of jersey loops as may be desired.

While the two-part manipulating mechanism as above exemplified expedites the operation and thus permits increased production on a given machine, it is not essential and there may be employed various other types of manipulating mechanism depending on the needs of a particular case. In Figs. 46-71 there is shown a one-piece manipulating means. In other words, the manipulations of the yarn to positions varying laterally to and transversely of the needle are performed by the sinker itself. As shown in Fig. 47 the sinkers 15b are provided with butts 16b moving in a special cam track 18b and have a usual inner end instead of a specially formed inner end as in the case of the sinkers 15 and 15a. The sinker 15b is formed with a tongue 80 which points inwardly as in the case of the tongue 22 but it and its slot 81 are somewhat differently formed as shown. Near its point 82 the tongue is bent forwardly so as to catch yarn extending from the fabric to the hook of a needle 6b. The portion of the sinker just above the slot 81 is bent forwardly at 83 to provide an abutment 84 which is similar in shape and purpose to the abutment 32 on the manipulators of Fig. 1.

Figure 52:
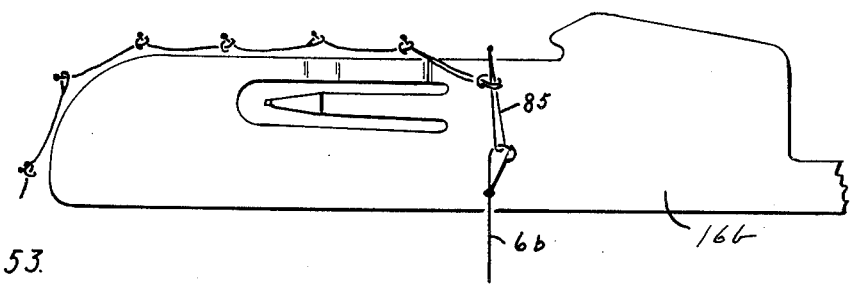
Figure 53:
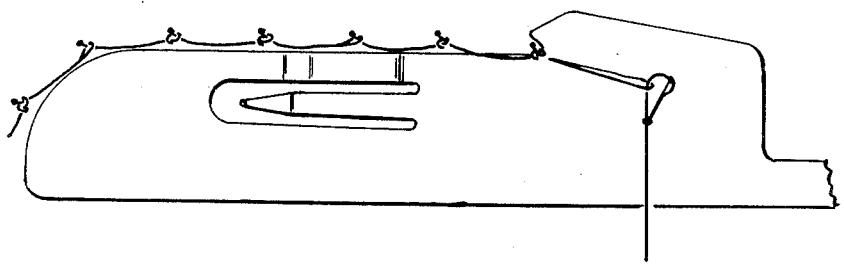
Figure 54:
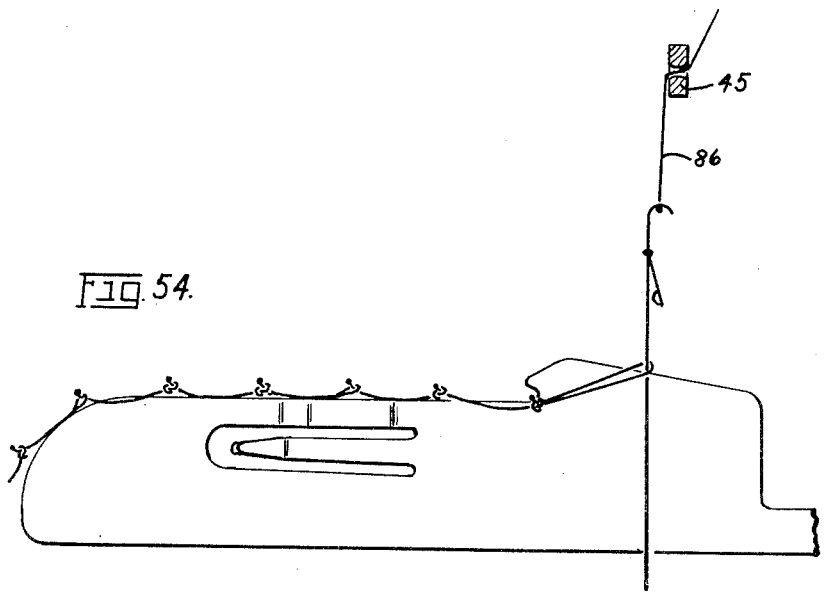
Figure 55:
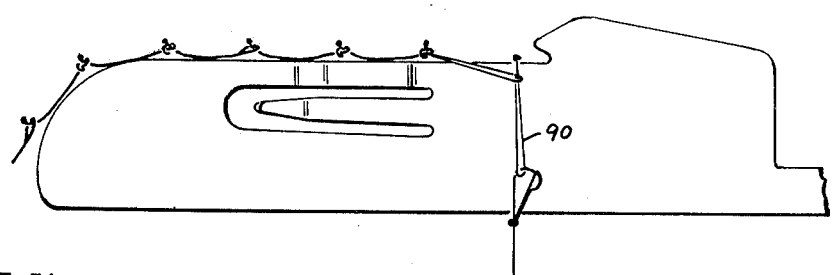
Figure 56:
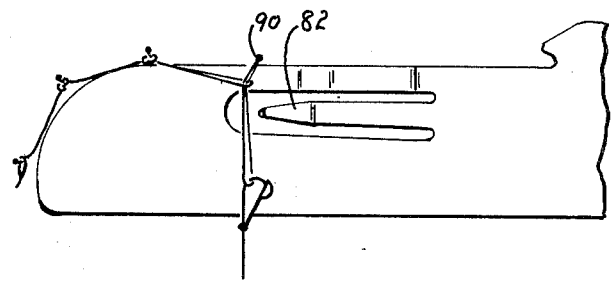
Figure 57:
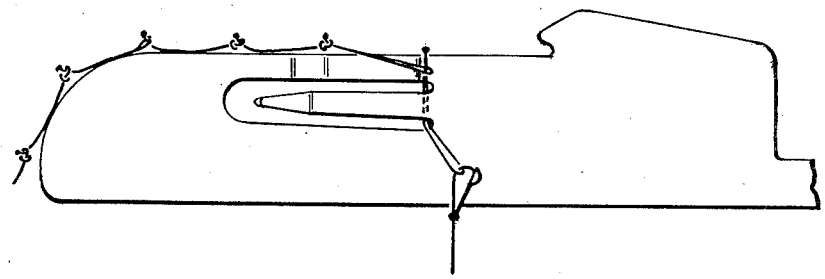
Figure 58:
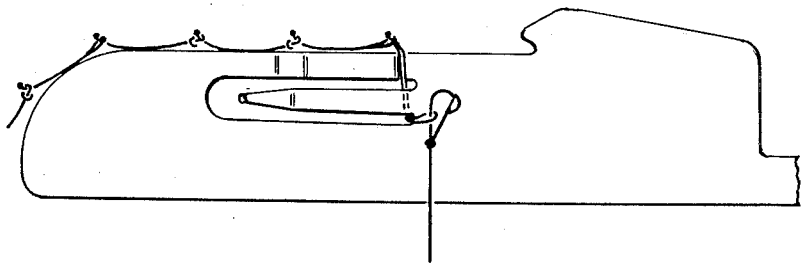
Figure 59:
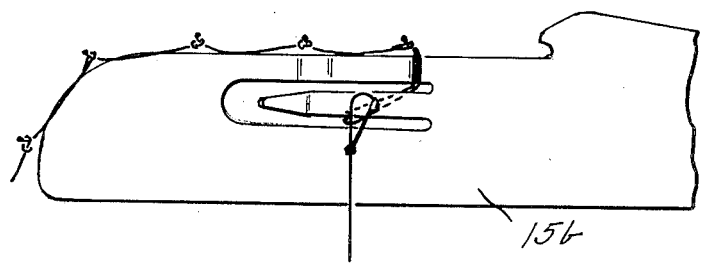
Figure 60:
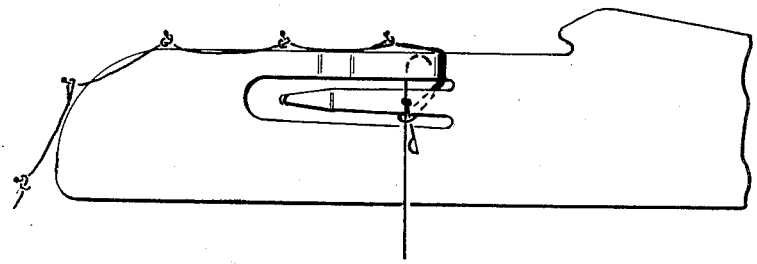
Figure 61:
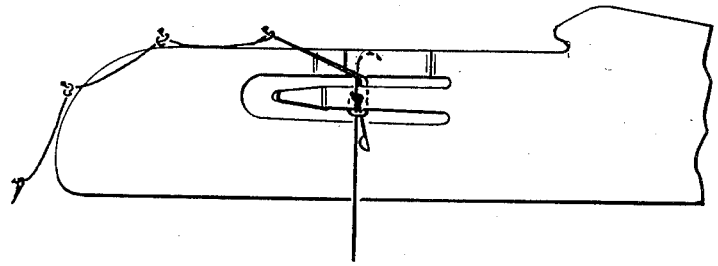
Figure 62:
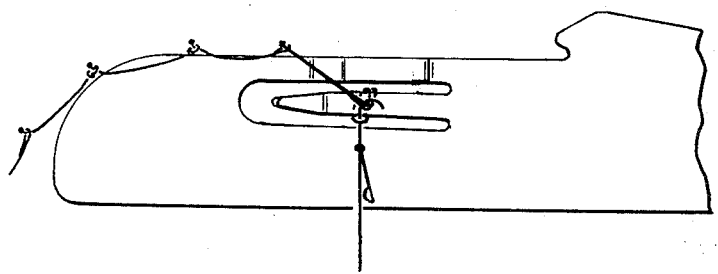
Figure 63:
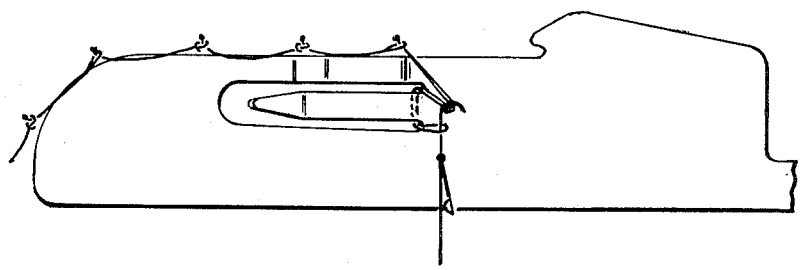
Figure 64:
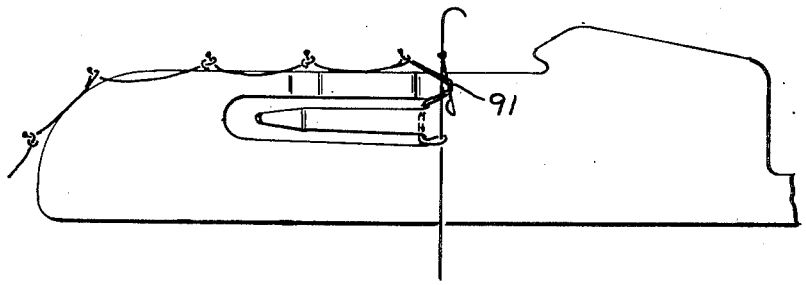
Figure 65:
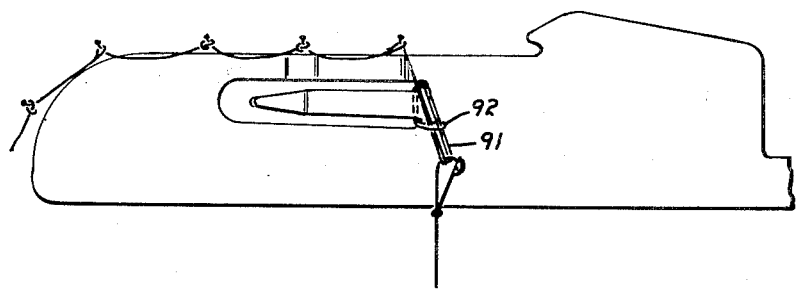
Figure 66:
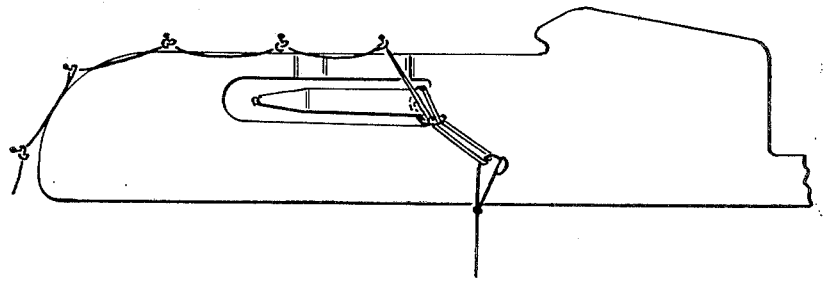

As exemplified in Fig. 52 the needle is retracted, and a loop 85 extends from the fabric to the hook of the needle 6b. An ordinary jersey stitch is formed by advancing the sinker (Fig. 53), and the needle (Fig. 54) until the latch of the needle has slipped from under the loop 85. The needle receives a new yarn 86 as from a yarn feed 45 and is retracted as shown in Fig. 55 to form a second jersey loop 90. A series of successive jersey loops may be formed in this manner but in order to form a knot the sinker is now drawn outwardly (Fig. 56) to bring the point 82 of the tongue outwardly of the loop 90. Upon the sinker being moved forwardly again, as shown in Fig. 57, the point 82 passes in front of the yarn so as to catch the yarn back of the tongue 80. As will be noted, the sinker has advanced far enough to bring the abutment 84 inwardly of the portion 91 of the loop 90. The needle is now advanced to the position of Fig. 58 to provide slack in the yarn, and a short retraction of the sinker as shown in Fig. 58 serves to carry the portion 91 to the position shown in Fig. 59 where the forwardly bent portion 83 of the sinker is directly above the needle so that the hook of the needle can go behind it as the needle is raised as shown in Fig. 60. The retraction of the sinker to the position shown in Fig. 61 results in the portion 91 slipping off the abutment 84, whereupon the pull of the fabric will draw it along the upper portion of the slot 81 and against the shank of the needle. The retraction of the needle (Fig. 62) results in the catching of the portion 91 of the loop in the hook of the needle so that as shown the bight 92 of the loop 90 and the portion 91 thereof are both held in the hook of the needle but are held apart by the tongue 80. The yarn is tightened by an inward movement of the sinker to the position shown in Fig. 63. The advance of the needle to the position shown in Fig. 64 results in slipping the bight of the loop off the latch but in the retention of the portion as at 91 on the latch. The retraction of the needle as shown in Fig. 65 thereupon results in pulling the portion 91 thru the bight 92. The outward movement of the sinker (Fig. 66) tightens the double loop 91 back from the needle and moves the abutment 84 outwardly of the path of needle movement, whereupon the needle may be advanced (Fig. 67) to receive an additional yarn 94 from a yarn feed and may be retracted (Fig. 68) to draw this yarn thru the portion 91 which still encircles the shank of the needle. Further outward movement of the sinker (Fig. 69), draws its tongue from within the circle of yarn which is wrapped around it whereupon the knot will form itself (in the same manner as in Figs. 21 and 21a), as shown in Fig. 70. The sinker is then moved inwardly as shown in Fig. 71 (as in ordinary practice) to tighten the loop on the needle.

A wide variety of modifications of the foregoing structures and procedures may be made without departing from the invention in its broader aspects. Changes in certain of the attachments without other change in the machine will produce variations in the types of knot, knit, or fabric produced. For example, the substitution of manipulators such as the manipulator 25c of Fig. 72 for the manipulators 25 will enable the machine of Figs. 1–4 to produce knots of the type shown in the Nuber Patent 1,887,166. As will be seen the end portion 95 thereof is made higher than the arm 30 of the manipulator 25, and, instead of being extended and bent back as at 31, is cut off and notched at 96. Thus the end 96 will, when the manipulator is moved outwardly, contact, not the newly formed loop as did the arm 30 in Fig. 11, but instead the sinker loop 97— i. e. the yarn between the previously formed loops—and move it outwardly in front of the needle, and back of the newly formed loops 98, so that when the needle is advanced and retracted a knot such as shown in said Nuber patent will be formed. Possible modifications include the substitution of various other types of needles for those shown. For example, spring needles may be used, with beard pressers serving in the well known manner thereof to cause the needles to perform their operations.

The invention lends itself exceptionally well to the production of knots of elastic yarn. In the formation of fabric such knots may be embodied in the fabric in variations ranging from provision of a single knot at a decorative point in a garment to the provision of a fabric composed entirely of knots of elastic yarn. Pursuant to the invention in its more specific aspects, however, such knots are provided in fabric composed partially of non-elastic yarns. The elastic yarn may be wholly formed into knots or may be formed into knots at some points and knitted into loops at other points. Particularly desirable effects can be obtained when the knots, or the knots and loops, of the elastic yarn are interspersed with loops or other knitted effects of non-elastic yarn.

One such arrangement is exemplified in Figs. 73 and 74 wherein elastic yarn is represented by heavy lines and non-elastic yarn by light lines and wherein knots are represented by an "X" and loops by an "O." The portion of the fabric represented comprises a row 100 of jersey loops of non-elastic (e. g. nylon) yarn, followed by a row 101 of knots (similar to the knot of Fig. 5) of elastic yarn. This is followed by a row 102 of ordinary (e. g. nylon) yarn knitted in jersey loops. Another row 103 of knots of elastic yarn follows. Two or more rows of yarn of knitting of a particular character may be provided. In the present instance the row 103 is followed by rows 104, 105 and 106 all of the loops of the ordinary yarn which in turn are followed by rows 107 and 108 of knots of the elastic yarn.

Another arrangement, and one which is particularly desirable in many instances, is exemplified in Fig. 75 wherein yarns, knots, and loops are represented in the same manner as in Fig. 74. The portion of the fabric exemplified comprises a row 111 of knots of elastic yarn which in the present instance is formed into knots in wales a, c, e and g and is unknitted therebetween, being knitted only on alternate needle of a series as, for instance, the first, third, fifth and seventh needles. Partially overlapping this row is a row 112 of plain loops of ordinary (e. g. nylon) yarn knitted into loops in wales b, d, f and h on only intermediate needles, for instance needles on the second, fourth, sixth and eighth of the series. The elastic yarn is thus, in the present instance, unknitted in wales b, d, f and h and the non-elastic yarn is unknitted in wales a, c, e and g. There follows row 113 of knots of elastic yarn formed in the same wales as the knots of the yarn 111 and a row 114 of loops of ordinary yarn formed in the same wales as the loops of the row 112. Following the row 114 is a row 115 in which elastic yarn is formed into a knot in wale a, a loop in wale c, a loop in wale e and a knot in wale g. There are then provided a row 116 of loops of ordinary yarn and a row 117 of elastic yarn knitted into jersey loops in wales *a* and *g* and in knots in wales *c* and *e*. There follows a row 118 of loops of ordinary yarn, a row 19 of loops of elastic yarn, a row 120 of loops of ordinary yarn, and a row 121 of elastic yarn formed into knots in wales *a* and *e* and into jersey loops in wales *c* and *g*.

As will be understood, the disposition of the loops and knots may be widely varied pursuant to the invention and the ordinary yarn and the elastic yarn may be interspersed in manners other than that of the first four rows of Fig. 73 and that of Fig. 74. One example is shown in Fig. 75.

Pursuant to the invention the rows may be formed in the order shown from top to bottom.

Since certain changes may be made in the constructions set forth and in carrying out the above method, and different embodiments of the invention may be provided without departing from the scope of the invention, it is intended that all matter contained in the above description or shown in the accompanying drawing shall be interpreted as illustrative and not in a limiting sense.

I claim:

1. In a knitting machine in combination, a series of independent needles, means to hold in one position with respect to the path of a needle one portion of the legs of a loop held by a needle and to hold another portion of the legs of a loop in another position with respect to the said needle path, and means to move the needle along said path while said holding means are operative.

2. A knitting machine comprising a series of independent needles, means to operate said needles to form a fabric, means to advance and retract a needle to form a loop, means movable across the line of said needles to move the legs of said loop outwardly of said needle, means to advance the needle to receive a portion of the loop between the outwardly-moved portion and the fabric, and means to retract the needle to draw the received-portion thru the bight of the loop.

3. A knitting machine comprising a series of independent needles, means to advance and retract a needle to form a loop, means movable across the line of the needles to draw a portion of the legs of the loop to one side of the path of a needle, means to advance the needle to receive a further portion of the loop, and means to retract the needle to draw the received legs thru the bight of the loop.

4. A knitting machine comprising a series of independent needles, means to advance and retract a needle to form a loop, means movable across the line of the needles to draw a portion of the legs of the loop to one side of the path of a needle, means movable across the line of said needles to move outwardly of said needle a loop-portion which is further from the bight of the loop, means to advance the needle to receive a further portion of the loop, and means to retract the needle to draw the last-mentioned loop-portion thru the bight of the loop.

5. In a knitting machine, in combination, a series of independent needles, means to advance and retract the needles to form a fabric, means movable across the line of the needle path a portion of the legs of a loop held by a retracted needle and to hold it there, means to move outwardly of the needle a loop-portion located between the first-mentioned loop-portion and the fabric while said first-mentioned portion is held to said one side of the needle, and means to guide the second-mentioned portion to the other side of the needle for reception thereby when advanced whereby said loop will be twisted around the needle.

6. In a knitting machine in combination, a series of independent needles, means to advance and retract the needles, manipulating elements movable across the line of the needles between the paths of movement of at least certain of said needles, said manipulating elements being adapted to move laterally of the paths of at least certain of said needles the legs of loops held by the latter when retracted and to hold them there, and to move outwardly of the needles loop-portions located further from the bight then the first-mentioned loop-portions while said first-mentioned loop-portions are held at one side of the needles, and means to guide the second-mentioned loop-portions to the other side of said needles for reception by the needles when advanced whereby the loops will be twisted around the needles.

7. In a knitting machine in combination, a row of independent needles, needle-operating means, manipulating means movable between at least certain parts of said needles, each of said manipulating means comprising means movable against the legs of a loop held by a retracted needle to move a portion of the loop to one side of the path of the needle, means to move a loop-portion located beyond the first-mentioned portion to the other side of said path while the first-mentioned loop portion is held by said movable means, and means to hold said loop portions on different sides of the needle while the needle is advanced to receive a loop portion located beyond said loop portions to draw it thru said first-mentioned portion.

8. A knitting machine comprising a series of independent needles, means to advance and retract a needle to form a loop, means movable across the line of the needles to move a leg-portion of said loop to one side of the path of said needle and to hold it there, means movable across the line of said needles to move outwardly of said needle a further loop-portion, means to advance the needle, means to permit the last-mentioned loop-portion to slip back against the shank of the needle while the first-mentioned loop-portion is held at said one side of the needle, means to retract the needle to draw the legs of the loop thru the bight thereof, and means to move said movable means to release the first-mentioned leg-portion.

9. A knitting machine comprising independent needles, sinkers cooperating with said needles, each of at least certain of said sinkers carrying a projection extending in the line of movement of the sinker and projecting from the side thereof sufficiently to receive thereunder the legs of a loop held by an adjacent needle, and means to advance at least certain of said needles after their loops are so received by their sinkers to pass said received portion and to receive portions of the loops beyond said received portions and to retract the advanced needles to draw the same thru the bights of the loops.

10. A knitting machine comprising independent needles, sinkers cooperating with said needles, each of at least certain of said sinkers carrying a projection extending in the line of movement of the sinker and projecting from the side thereof sufficiently to receive thereunder the legs of a loop held by an adjacent needle, manipulator means adapted to move to the other side of the paths of said needles a portion of the legs of the loop further from the bight thereof, and means to advance at least certain of said needles while their loops are so held by their sinkers to pass said held portions and to receive portions of the loops beyond said held portions and to retract the advanced needles to draw the same thru the bights of the loops.

11. A knitting machine comprising a needle bed, a series of independent needles thereon, a sinker bed having a series of slots therein, sinkers in said slots, operating means, said beds and said operating means being mounted for relative movement, each of at least certain of said sinkers carrying a projection extending in the line of movement of the sinker and projecting from the side thereof sufficiently to receive thereunder the legs of a loop held by an adjacent needle, manipulator means movable in certain slots with said certain of said sinkers and adapted to move to the other side of the paths of said needles a portion of the legs of the loop further from the bight thereof, and means to advance at least certain of said needles while their loops are so held by their sinkers to pass said held portions and to receive portions of the loops beyond said held portions and to retract the advanced needles to draw the same thru the bights of the loops.

12. A knitting machine comprising independent needles, a sinker cooperating with at least one of said needles and carrying a projection extending in the line of movement of the sinker and projecting from the side thereof sufficiently to receive thereunder the legs of a loop on said needle, and means to advance said needle while its loop is so received by said sinker to pass received portion and to receive a portion of the loop beyond said received portion and to retract the advanced needle to draw the same thru the bight of the loop.

13. A sinker having a portion cut out from a portion thereof which is substantially central both horizontally and vertically but attached thereto at one end and bent laterally to provide a yarn-engaging portion.

14. A sinker having a strip running longitudinally thereof and cut from a portion thereof which is substantially central both horizontally and vertically except at one of its ends and having a bend therein so that its other end projects to one side of the sinker.

15. A sinker having thereon a projection which has a major component extending from a portion thereof which is substantially central both horizontally and vertically in a direction longitudinal of the sinker and a minor component extending in a direction transverse of the sinker and which is adapted to be moved over a yarn at one side of the sinker by a longitudinal movement of the sinker and to hold the yarn while the yarn is being manipulated.

16. Knitting mechanism comprising a sinker having a depression in one side thereof, and a yarn-manipulating element associated with and movable relatively to the sinker and having a projection resiliently pressed against the sinker and movable into said depression during said relative movement so as to move under yarn hanging from the sinker and bridging the depression.

17. A yarn manipulator comprising an elongated body portion having at one end a butt adapted to fit into a cam groove and at the other end an upwardly-extending arm from an upper portion of which a second arm extends backwardly to provide a yarn-manipulating portion, one of said arms being bent laterally a sufficient amount so that an extent of the yarn-manipulating portion lies in a plane to one side of said elongated body portion.

18. A yarn manipulator comprising an elongated body portion having at one end a butt adapted to fit into a cam groove and at the other end an upwardly-extending arm from an upper portion of which a second arm extends backwardly to provide a yarn-manipulating portion, the first mentioned arm having a lateral bend therein between said elongated body portion and said second arm whereby at least a portion of said second arm will be disposed laterally of said body portion so that when said manipulating element is in a sinker slot with a sinker the sinker may lie above said elongated body portion and said portion of said second arm may extend to one side of the sinker.

19. A yarn manipulator comprising an elongated body portion having at one end a butt adapted to fit into a cam groove and at the other end an upwardly-extending arm from an upper portion of which a second arm extends backwardly to provide a yarn-engaging abutment lying in a plane to one side of said elongated body portion.

20. Knitting mechanism comprising a sinker bed, slots in said bed, and yarn-manipulating means in at least certain of said slots comprising a manipulator element and a sinker disposed one above another, said bed being formed with independent cam tracks of different contour for guiding said sinkers and said manipulator elements respectively, and said sinkers and manipulator elements being formed with independent guide portions adapted to be controlled by said cam tracks, each of a plurality of said manipulator elements comprising an elongated body portion adapted to lie underneath its sinker in the same plane as its sinker and a yarn-manipulating arm extending rearwardly from a forward portion of the element and lying in a plane to one side of its sinker.

21. Knitting mechanism comprising a sinker bed, slots in said bed, and yarn-manipulating means in at least certain of said slots comprising a manipulator element and a sinker disposed one above another, said bed being formed with independent cam tracks of different contour for guiding said sinkers and said manipulator elements respectively, and said sinkers and manipulator elements being formed with independent guide portions adapted to be controlled by said cam tracks, each of a plurality of said manipulator elements comprising an elongated body portion adapted to lie underneath its sinker in the same plane as its sinker and a yarn-manipulating arm extending rearwardly from a forward portion of the element and lying in a plane to one side of said sinker, and each of a plurality of said sinkers having a strip running longitudinally thereof at a point below said arm and cut from a central portion thereof except at one of its ends and bent so that its other end lies on the same side of the sinker as said arm.

22. A knitting method comprising forming a loop on a needle, holding a portion of the legs of the loop in one position and another portion of the legs of the loop in another position while the needle is advanced between the portions, catching a portion of the legs of the loop on the needle, and retracting the needle while at least one of the aforesaid portions is held unreleased.

23. The method of forming a knot on an independent-needle knitting machine which comprises advancing and retracting a needle to form a loop, holding a leg-portion of the loop to one side of the needle path, holding at the other side of the needle path a further loop-portion, advancing the needle to catch a leg-portion beyond the first-mentioned leg-portion, and retracting the needle to draw the legs of the loop thru the bight thereof while the first mentioned leg portion is held.

24. The method of forming a knot on an independent-needle knitting machine which comprises advancing and retracting a needle to form a loop, holding a leg-portion of the loop to one side of the needle path, holding at the other side of the needle path a further loop-portion, advancing the needle to catch a leg-portion beyond the first mentioned leg-portion, retracting the needle to draw the legs of the loop thru the bight thereof while the first mentioned leg portion is held, and releasing the first-mentioned leg portion.

25. The method of forming a knot on an independent-needle knitting machine which comprises advancing and retracting a needle to form a loop, holding a leg-portion of the loop to one side of the needle path, holding at the other side of the needle path a further loop-portion, advancing the needle to catch a leg-portion beyond the first mentioned leg-portion, retracting the needle to draw the legs of the loop thru the bight thereof while the first mentioned leg portion is held, releasing the first-mentioned leg portion, and advancing and retracting the needle to receive yarn and to form a loop thereof.

26. The method of forming a knot on an independent-needle knitting machine which comprises advancing and retracting a needle to form a loop, holding a leg-portion of the loop to one side of the needle path, moving outwardly of the needles a further loop-portion, advancing the needle to catch the legs of the loop at a point which is still further along it, and retracting the needle to draw the legs of the loop thru the bight thereof.

27. Knitting mechanism comprising a series of rearward facing needles, a sinker bed, slots in said bed extending toward said series of needles, and slidable elements in said slots, the relative width of the forward ends of the slots and of the slidable elements therein being varied near the forward end of the slots to provide a space between at least one side of a slidable element and the wall of its slot as the slot approaches said series of needles to permit play enabling the slidable element to yield laterally on encountering an obstruction in moving beyond its slot.

28. Knitting mechanism comprising a series of rearward facing needles, a sinker bed, slots in said bed extending inwardly toward said series of needles, sinkers slidably mounted in said slots, supplemental elements slidably mounted in the said slots and formed with portions extending forwardly, then transversely and then rearwardly and forming parts of said supplemental elements, said portions being positioned to push in front of the hooks of the needles yarn held in the path of movement of said portions.

29. Knitting mechanism comprising a series of rearward facing needles, a sinker bed, slots in said bed extending inwardly toward said series of needles, sinkers slidably mounted in said slots, supplemental elements slidably mounted in the said slots and formed with portions extending forwardly, then transversely and then rearwardly and forming parts of said supplemental elements, said portions being positioned to push in front of the hooks of the needles a newly formed loop held in the path of movement of said portions.

30. Knitting mechanism comprising a series of needles, a sinker bed, slots in said bed extending inwardly toward said series of needles, sinkers slidably mounted in said slots, supplemental elements slidably mounted in the said slots and formed with portions extending inwardly and then outwardly and forming a part of said supplemental elements, said portions being positioned on said supplemental element to push in front of the hooks of the needles a yarn held in the path of movement of said portions.

VINCENT LOMBARDI.

References Cited in the file of this patent

UNITED STATES PATENTS

| Number | Name | Date |
| --- | --- | --- |
| 1,181,962 | Scott | May 2, 1916 |
| 1,230,322 | Pidgeon | June 19, 1917 |
| 1,475,176 | English | Nov. 27, 1923 |
| 1,782,486 | Stewart | Nov. 25, 1930 |
| 1,786,255 | Miller | Dec. 23, 1930 |
| 1,874,198 | Larmour | Aug. 30, 1932 |
| 2,069,672 | Lawson | Feb. 2, 1937 |
| 2,083,301 | Jones | June 8, 1937 |
| 2,116,358 | Leedham et al. | May 3, 1938 |
| 2,257,235 | Grimm et al. | Sept. 30, 1941 |
| 2,292,940 | Holmes et al. | Aug. 11, 1942 |
| 2,295,793 | Kaufman | Sept. 15, 1942 |
| 2,434,045 | Lombardi | Jan. 6, 1948 |

FOREIGN PATENTS

| Number | Country | Date |
| --- | --- | --- |
| 449,404 | Great Britain | June 24, 1936 |
| 655,409 | Germany | Jan. 15, 1938 |